(12) United States Patent
Lacivita et al.

(10) Patent No.: US 12,362,362 B2
(45) Date of Patent: Jul. 15, 2025

(54) POSITIVE ELECTRODE ACTIVE MATERIAL AND ELECTROCHEMICAL CELL COMPRISING THE POSITIVE ELECTRODE ACTIVE MATERIAL

(71) Applicant: Samsung Electronics Co., Ltd., Suwon-si (KR)

(72) Inventors: Valentina Lacivita, Cambridge, MA (US); Yongwoo Shin, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 652 days.

(21) Appl. No.: 17/672,187

(22) Filed: Feb. 15, 2022

(65) Prior Publication Data

US 2023/0187635 A1 Jun. 15, 2023

Related U.S. Application Data

(60) Provisional application No. 63/289,820, filed on Dec. 15, 2021.

(51) Int. Cl.
| | | |
|---|---|---|
| *H01M 4/58* | (2010.01) | |
| *C01B 25/45* | (2006.01) | |
| *H01M 10/0525* | (2010.01) | |
| *H01M 4/02* | (2006.01) | |

(52) U.S. Cl.
CPC ........... *H01M 4/5825* (2013.01); *C01B 25/45* (2013.01); *H01M 10/0525* (2013.01); *C01P 2002/30* (2013.01); *C01P 2004/64* (2013.01); *C01P 2006/40* (2013.01); *H01M 2004/021* (2013.01); *H01M 2004/028* (2013.01)

(58) Field of Classification Search
CPC ............................. H01M 4/5825; C01B 25/45
See application file for complete search history.

(56) References Cited

U.S. PATENT DOCUMENTS

| | | |
|---|---|---|
| 9,570,746 B2 | 2/2017 | Sun et al. |
| 10,276,862 B2 | 4/2019 | Mun et al. |
| 10,957,903 B2 | 3/2021 | Yang et al. |
| 2016/0351973 A1 | 12/2016 | Albano et al. |
| 2021/0202940 A1 | 7/2021 | Li et al. |

FOREIGN PATENT DOCUMENTS

| | | | |
|---|---|---|---|
| CN | 112038609 A | 12/2020 | |
| CN | 112216829 A | * 1/2021 | ............. C01B 25/45 |

OTHER PUBLICATIONS

Chung et al, "Surface Orientation Dependent Distribution of Subsurface Cation Exchange Defects in Olivine Phosphate" ACS Nano, vol. 9, 2015 (Year: 2015).*

(Continued)

*Primary Examiner* — Amanda C. Walke
(74) *Attorney, Agent, or Firm* — CANTOR COLBURN LLP

(57) ABSTRACT

A positive electrode active material includes a plurality of lithium nickel phosphate nanoparticles having an olivine structure and having an exposed surface that is a {111} crystal plane. The positive electrode active material can be used in a positive electrode for an electrochemical cell.

9 Claims, 2 Drawing Sheets

(56) References Cited

OTHER PUBLICATIONS

Tao et al, Synthesis of LiNiPO4 via citrate Sol-Gel route, Journal of sol-gel Science and Technology 87:240-244 (2018). (Year: 2018).*
Cherkashinin et al, Olivine-LiNiPO4 Thin Films: Chemical Compatibility with Liquid Electrolyte and Interface Stability at High Potential. Journal of The Electrochemical Society, 165(4), H3143-H3147 (2018) (Year: 2018).*
Tolganbek et al, Current state of high voltage olivine structured LiMPO4 cathode materials for energy storage applications: A review, Journal of Alloys and Compounds, vol. 882, 160774 (2021) (Year: 2021).*
Ornek, A. "The synthesis of novel LiNiPO4 core and Co3O4/CoO shell materials by combining them with hard-template and solvothermal routes," Journal of Colloid and Interface Science, vol. 504, 2017; pp. 468-478.
Ornek, A. et al., "A novel and effective strategy for producing core-shell LiNiPO4/C cathode material for excellent electrochemical stability using a long-time and low-level microwave approach," Scropta Materialia, vol. 122, 2016; pp. 45-49.
Padhi, A. K. "Phospho-olivines as Positive-Electrode Materials for Rechargeable Lithium Batteries," Journal of the Electrochemical Society, vol. 144, No. 4, Apr. 1997; 8 pages.
Surthi, K. K. et al., "Shape controlled and structurally stabilized Co-doped olivine lithium phosphate cathodes for high voltage conventional, thin and flexible Li-ion batteries," Chemical Engineering Journal, vol. 399, 2020; 15 pages.
Wang, L. "Ab Initio Study of the Surface Properties and Nanoscale Effects of LiMnPO4," Electrochemical and Solid-State Letters, vol. 11, No. 6, 2008; pp. A94-A96.
Wolfenstine, J. et al., "Ni3+/Ni2+ redox potential in LiNiPO4," Journal of Power Sources, vol. 142, 2005; pp. 389-390.

* cited by examiner

POSITIVE ELECTRODE ACTIVE MATERIAL AND ELECTROCHEMICAL CELL COMPRISING THE POSITIVE ELECTRODE ACTIVE MATERIAL

CROSS-REFERENCE TO RELATED APPLICATION

This application claims priority to U.S. Provisional Patent Application No. 63/289,820, filed on Dec. 15, 2021, in the United States Patent and Trademark Office, and all the benefits accruing therefrom under 35 U.S.C. § 119, the content of which is incorporated herein in its entirety by reference.

BACKGROUND

(1) Field

Disclosed is a positive electrode active material, a positive electrode comprising the positive electrode active material, and a method for the manufacture thereof. Also disclosed is an electrochemical cell comprising the positive electrode active material.

(2) Description of the Related Art

Currently available positive electrode materials for lithium-ion batteries can limit the energy density and dominate the cost of the battery. Current commercial lithium-ion batteries generally employ intercalation oxide cathodes, for example layered oxides such as $LiCoO_2$ (LCO), having an operating voltage of about 4 volts and a practical capacity of 140 mAh/g. However, $LiCoO_2$ is expensive and a stable supply is not ensured. As an alternative to $LiCoO_2$ cathode active materials including nickel and manganese have been developed. Nonetheless, there remains a continuing need in the art for improved high voltage positive electrode materials, particularly for rechargeable batteries capable of satisfying greater device performance demands.

SUMMARY

Disclosed is a positive electrode active material comprising a plurality of lithium nickel phosphate nanoparticles having an olivine structure and having an exposed surface that is a (111) crystal plane.

Also disclosed is a positive electrode comprising the positive electrode active material.

Also disclosed is an electrochemical cell comprising: the positive electrode comprising the positive electrode active material; a negative electrode; and a separator between the positive electrode and the negative electrode.

Also disclosed is an electrochemical cell comprising: the positive electrode comprising the positive electrode active material; a negative electrode; and a solid electrolyte between the positive electrode and the negative electrode.

DETAILED DESCRIPTION

Current commercial lithium-ion batteries generally employ intercalation oxide cathodes, for example layered oxides such as $LiCoO_2$ (LCO). Polyanion oxides can offer several advantages compared to layered oxides including high thermal stability, improved safety, and can provide higher voltages due to the so-called "inductive effect." In particular, among the 3d transition metals, nickel (Ni) can provide the highest cell voltage and increased capacity.

Ni-rich oxides have attracted interest due to their low price and high discharge capacities compared to commercial LCO materials. However, Ni-based polyanion compounds such as olivine $LiNiPO_4$ (LNP) can be difficult to activate electrochemically. Without wishing to be bound by theory, it is believed that due to the polyanion inductive effect on the transition metal, the Ni d states are lowered such that the voltage becomes limited by the oxidation of the anion. Also, polyanion oxides can have low electrical conductivity, hindering lithium insertion/de-insertion.

Figures 1A, 1B, 1C:
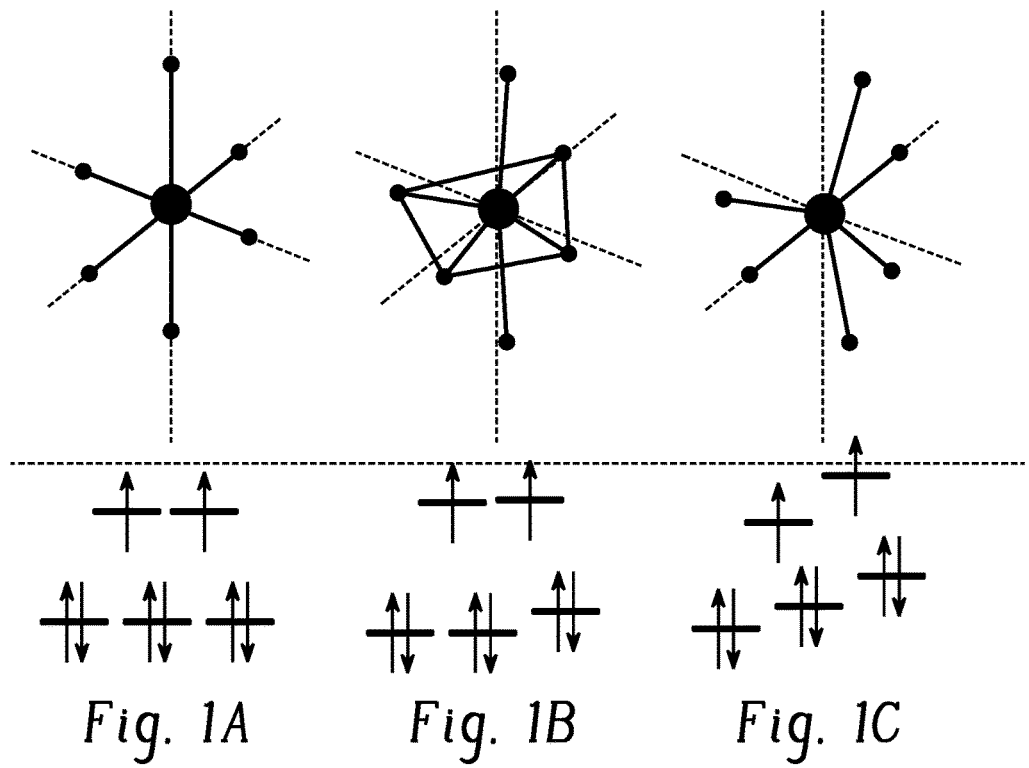
FIG. 1A is a schematic diagram showing transition metal d orbital energies when in octahedral coordination.
FIGS. 1B and 1C are schematic diagrams showing transition metal d orbital energies when the octahedral coordination is distorted.

The present inventors have unexpectedly discovered that symmetry breaking at the (111) surface in the Ni olivine structure of $LiNiPO_4$ can result in energy level splitting. In octahedral coordination, the Ni d orbitals have 3-fold degenerate $t_{2g}$ states and 2-fold degenerate $e_g$ states. Breaking the octahedral symmetry can cause splitting of the d states, as shown schematically in FIG. 1A to 1C. FIG. 1A shows the d orbitals in an undistorted configuration, and FIGS. 1B and 1C the d orbitals with different degrees of distortion. Complete splitting of the d states shifts the highest energy state at the Fermi level, resulting in improved electrical conductivity. This effect is shown schematically in FIGS. 1B and 1C, which illustrate that when the octahedral symmetry is broken, the d states split, resulting in a shift of the d electrons near the Fermi level to higher energy. The shift of the d electrons to higher energy levels advantageously allows activation of the $Ni^{2+/3+}$ redox before anion oxidation.

Disclosed is a positive electrode active material comprising a plurality of lithium nickel phosphate nanoparticles having an olivine structure and having an exposed surface that is a {111} crystal plane. Specifically, and while not wanting to be bound by theory, the present inventors have unexpectedly found that the desired symmetry breaking occurs at a {111} surface. Thus increasing exposure of the {111} crystal plane facilitates the desired effect on Ni coordination, i.e. symmetry breaking, and the shift of Ni d orbitals at the Fermi level. Accordingly, cathode active materials where nickel redox is not directly active can be activated by exposing and/or increasing the area of particular redox active surfaces.

The lithium nickel phosphate having an exposed surface that is a {111} crystal plane can be useful as a positive electrode active material. Lattice directions and lattice planes in a unit cell of a single crystal material can be described by Miller indices. Specifically, the notation {hkl} refers to a set of crystallographically equivalent planes, e.g., a (111) plane, a (222) plane, a (333) plane, or the like. The exposed surface of the lithium nickel phosphate nanoparticle can be a {111} crystal plane, e.g., a (111) plane, a (222) plane, or a (333) plane, or the like. In an aspect, a (111) crystal plane is provided.

The lithium nickel phosphate nanoparticles having an exposed surface that is a {111} crystal plane represents an aspect of the disclosure. The lithium nickel phosphate nanoparticles have an olivine-type structure. "Olivine" or "olivine-type structure" as used herein means that the compound has a crystal structure that is isostructural with olivine, $(Mg_xFe_{(1-x)})_2SiO_4$, wherein $0 \le x \le 1$, disregarding the distortion in the transition metal sites.

In an aspect the {111} crystal plane can have, for example, a surface area that is 20% to 95% of the total surface area of the nanoparticle. Within this range, the exposed surface area of the {111} crystal plane can be at least 25%, or at least 30%, or at least 35%, or at least 40%, or at least 50%, or at least 60%, or at least 70%, or at least 80%, or at least 90% of the total surface area of the nanoparticle. Also within this range, the exposed surface area of the {111} crystal plane can be at most 90%, or at most 85%, or at most 75%, or at most 70%, or at most 60%, or at most 50%, or at most 40%, or at most 30% of the total surface area of the nanoparticle.

In addition to the (111) crystal plane, the nanoparticle can have one or more additional exposed crystal planes, for example a (010) or (201) crystal plane. In an aspect, the total area of the {111} crystal plane to the {010} crystal plane can be from 1:9 to 9:1, and the total area of the {111} crystal plane to the 12011 crystal plane can be from 1:9 to 9:1.

In an aspect, the lithium nickel phosphate nanoparticles can have an average particle diameter of less than 100 nanometers (nm). For example, the lithium nickel phosphate nanoparticles can have an average particle diameter of 1 to less than 100 nm, or 1 to 75 nm, or 1 to 50 nm, or 1 to 40 nm, or 1 to 25 nm, or 10 to 20 nm.

Surface area of the crystal planes and particle size can be determined, for example, by transmission electron microscopy (TEM), scanning electron microscopy (SEM), or other suitable imaging techniques.

The lithium nickel phosphate nanoparticles having an exposed surface that is a {111} crystal plane can provide certain technical advantages compared to lithium nickel phosphate nanoparticles in which the {111} is not exposed or comprises less than 25% of the total surface area of the nanoparticle. For example, currently available lithium nickel phosphate cannot be oxidized and reduced at a rate or to a degree suitable for a practical battery. Stated another way, in currently available lithium nickel phosphate, nickel oxidation is not observed at practical potentials, e.g., between 0 and 6 volts vs $Li/Li^+$, and electron conduction is poor. In contrast, the lithium nickel phosphate nanoparticles having an exposed surface that is a {111} crystal plane can exhibit improved activity towards nickel, and electron-polaron conductivity can be activated. For example, the disclosed lithium nickel phosphate can have a $Ni^{2+}/Ni^{3+}$ redox potential of up to about 5 volts (V) against $Li^+/Li$. The capacity of the disclosed lithium nickel phosphate nanoparticles having the exposed {111} surface can be increased relative to that of alternative cathode materials, for example by at least 10%, or at least 20%, or at least 50%, facilitating the development of batteries having increased energy density.

The lithium nickel phosphate can be of the formula $Li_xNi(PO_4)$, wherein $0 \le x \le 1.1$.

The positive electrode active material described herein can be manufactured by a method effective to expose the {111} crystal plane. In an aspect, the lithium nickel phosphate nanoparticles can be prepared by depositing lithium nickel phosphate under conditions effective to provide the desired nanoparticles having the exposed {111} surface. For example, vacuum deposition can be used. Solution-based methods also may be used to provide the lithium nickel phosphate nanoparticles having the desired shape and exposed surface.

In an aspect, the positive active material can be provided by post-processing pristine lithium nickel phosphate particles to expose the {111} crystal plane. For example, the method can comprise physically and/or chemically processing pristine lithium nickel phosphate nanoparticles under conditions effective to selectively expose the {111} crystal plane. An exemplary physically processing technique can include, but is not limited to, ball milling, roller milling, disk milling, hammer milling, jet milling. In an aspect, lithium nickel phosphate nanoparticles can be provided by combining a lithium precursor, a nickel precursor, and a phosphate precursor in the presence of a solvent to provide a suspension of lithium nickel phosphate nanoparticles, e.g., provided when the lithium nickel phosphate nanoparticles precipitate from solution. The lithium nickel phosphate nanoparticles can be isolated and optionally further processed for example under hydrothermal conditions to provide the lithium nickel phosphate nanoparticles. The lithium nickel phosphate nanoparticles so obtained can then be further processed to expose the {111} crystal plane.

The positive electrode active material described herein can be particularly useful in a component of an electrochemical cell. Another aspect of the present disclosure is a positive electrode comprising the positive active material.

The positive electrode can be formed by forming a layer comprising the positive electrode active material on a current collector. For example, a positive electrode mixture can be prepared by adding solid electrolyte particles and a solvent to the positive electrode active material, and the positive electrode mixture can be coated and dried on a current collector to provide the positive electrode. The solvent can be any suitable solvent and is not particularly limited as long as it can be used in preparation of a positive electrode mixture. The solvent can be a non-polar solvent. The non-polar solvent does not easily react with a solid electrolyte particle. Subsequently, the positive electrode mixture thus prepared is coated and dried on a current collector by using, for example, a doctor blade. Then, the current collector and a layer of the cathode mixture can be compressed by using a roll-press to prepare the positive electrode layer.

The positive electrode layer can include additives, for example, a conducting agent, a binding agent, an electrolyte, a filler, a dispersing agent, and an ion conducting agent, which can be appropriately selected and combined, in addition to positive electrode active material comprising the core and the coating, as described above.

The conductive agent can include, for example, carbon black, carbon fiber, graphite, carbon nanotubes, graphene, graphene nanoribbon, fullerenes or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

In an aspect, the conducting agent can include graphite, carbon black, acetylene black, Ketjen black, carbon fibers, or a metal powder.

A binder for the positive electrode can facilitate adherence between components of the positive electrode, such as the positive active material and the conductor, and adherence of the positive electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the positive electrode to the current collector may be suitably strong.

The positive electrode can further comprise an electrolyte. When present, the electrolyte can be a solid electrolyte and can comprise a ceramic, glass ceramic, or polymer. The solid electrolyte can be of the same composition as the electrolyte in the separator, or it can be selected to be more electrochemically stable with the positive active material. Examples of the electrolyte can include an oxide-containing solid electrolyte, which will be described in detail below. Also, the filler, the dispersing agent, and the ion conducting agent can be selected from commercially available materials for the manufacture of an electrode of an electrochemical cell.

Another aspect of the present disclosure is an electrochemical cell comprising the positive electrode active material described herein. The electrochemical cell can be fabricated in any suitable shape, and can be prismatic or cylindrical, and can have a wound or stacked configuration. The shape of the electrochemical cell is not limited to the above mentioned shapes and can be shaped in various forms other than the foregoing.

In an aspect, the electrochemical cell of the present disclosure comprises a positive electrode comprising the positive electrode active material described above, a negative electrode, and an electrolyte between the positive electrode and the negative electrode. In an aspect, the electrochemical cell of the present disclosure comprises a positive electrode comprising the positive electrode active material described above, a negative electrode, and a separator between the positive electrode and the negative electrode.

The positive electrode can be as described above.

The negative electrode can be produced from a negative active material composition including a negative active material, and optionally, a conductive agent, and a binder. The negative active materials that can be used in the electrochemical cell include materials capable of storing and releasing lithium ions electrochemically. Such negative electrode active material can be a well-known negative electrode active material for lithium-ion batteries such as hard carbon, soft carbon, carbon black, ketjen black, acetylene black, activated carbon, carbon nanotubes, carbon fiber, amorphous carbon, or other carbon materials. Also usable are lithium-containing metals and alloys, wherein the metal can be any suitable metal, e.g., Si, Sn, Sb, or Ge. Lithium-containing metal oxides, metal nitrides, and metal sulfides are also useful, in particular wherein metal can be Ti, Mo, Sn, Fe, Sb, Co, or V. Also useable are phosphorous (P) or metal doped phosphorous (e.g., $NiP_3$). The negative active material is not limited to the foregoing and any suitable negative active material can be used. The negative electrode can be produced by a method similar to that used to obtain the positive electrode.

In an aspect, the negative electrode comprises graphite. In an aspect, the negative electrode comprises lithium metal.

As the separator, when present, a porous olefin film such as polyethylene and polypropylene, and polymer electrolyte can be used. The separator can be porous, and a diameter of a pore of the separator can be in a range of 0.01 to 10 micrometers (μm), and a thickness of the separator can be in a range of 5 to 300 μm. In greater detail, the separator can be a woven or a non-woven fabric comprising an olefin-based polymer such as polypropylene or polyethylene; or a glass fiber.

The electrolyte disposed between the positive electrode and the negative electrode may be a solid electrolyte, for example an inorganic solid electrolyte. In an aspect, the solid electrolyte can be an oxide solid electrolyte.

Examples of the oxide solid electrolyte may include $Li_{1+x+y}Al_xTi_{2-x}Si_yP_{3-y}O_{12}$ (where $0<x<2$ and $0\leq y<3$), $BaTiO_3$, $Pb(Zr_aTi_{1-a})O_3$ (PZT) where $0\leq a\leq 1$, $Pb_{1-x}La_xZr_{1-y}Ti_yO_3$ (PLZT) where $0\leq x\leq 1$ and $0\leq y<1$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ where $0<x<2$, $0<y<1$, and $0<z<3$, $Li_{1+x+y}(Al_aGa_{1-a})_x(Ti_bGe_{1-b})_{2-x}Si_yP_{3-y}O_{12}$ where $0\leq x\leq 1$, $0\leq y\leq 1$, $0\leq a\leq 1$, and $0\leq b\leq 1$, $Li_xLa_yTiO_3$ where $0<x<2$ and $0<y<3$, $Li_2O$, LiOH, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$ where M is Te, Nb, or Zr, and $0\leq x\leq 10$. Also mentioned is a lithium garnet such as $Li_7La_3Zr_2O_{12}$ (LLZO) or $Li_{3+x}La_3Zr_{2-a}Me_aO_{12}$ (e.g., Me-doped LLZO, where Me is Ga, W, Nb, Ta, or Al, and $0\leq x\leq 10$ and $0\leq a<2$). A combination comprising at least one of the foregoing may be used.

In an aspect, the oxide solid electrolyte may have any suitable structure, e.g., a garnet structure a perovskite structure, an argyrodite structure, or an amorphous structure. A representative example of a garnet solid electrolyte includes $Li_{6.5}La_3Zr_{1.5}Ta_{0.5}O_{12}$. An example of a perovskite solid electrolyte may be $Li_{0.33}La_{0.5}TiO_3$.

The solid electrolyte can be in the form of a particle, and can have, for example, a spherical form, an oval-spherical form, or the like. The particle diameter of the solid electrolyte is not particularly limited, and the solid electrolyte can have a mean particle diameter ranging, for example, from 0.01 to 30 μm for example, 0.1 to 20 μm. As described above, the mean particle diameter refers to a number average diameter (D50) of the particle size distribution of particles obtained by scattering, or the like.

The solid electrolyte can be deposited using a film formation method, for example, by blasting, aerosol deposition, cold spraying, sputtering, chemical vapor deposition ("CVD"), spraying, or the like, thereby preparing a solid electrolyte layer. In addition, the solid electrolyte layer can be formed by pressing the solid electrolyte. In addition, the solid electrolyte layer can be formed by mixing the solid electrolyte, a solvent, a binder, on a support and pressing the resulting mixture. In this case, the solvent or the support is added to reinforce the strength of the solid electrolyte layer or prevent short-circuit of the solid electrolyte.

The electrochemical cell can be manufactured by providing a positive electrode, providing a negative electrode, and disposing an electrolyte between the positive electrode and the negative electrode to manufacture the electrochemical cell. For example, the positive electrode, the negative electrode, and the solid electrolyte, which have been formed using the above-described methods, can be stacked such that the solid electrolyte layer is disposed between the positive electrode and the negative electrode, and the resulting structure can be pressed to provide the electrochemical cell.

When the electrochemical cell further comprises a separator, the method can further comprise disposing a separator between the positive electrode and the negative electrode.

This disclosure is further illustrated by the following examples, which are non-limiting.

EXAMPLES

Figure 2:
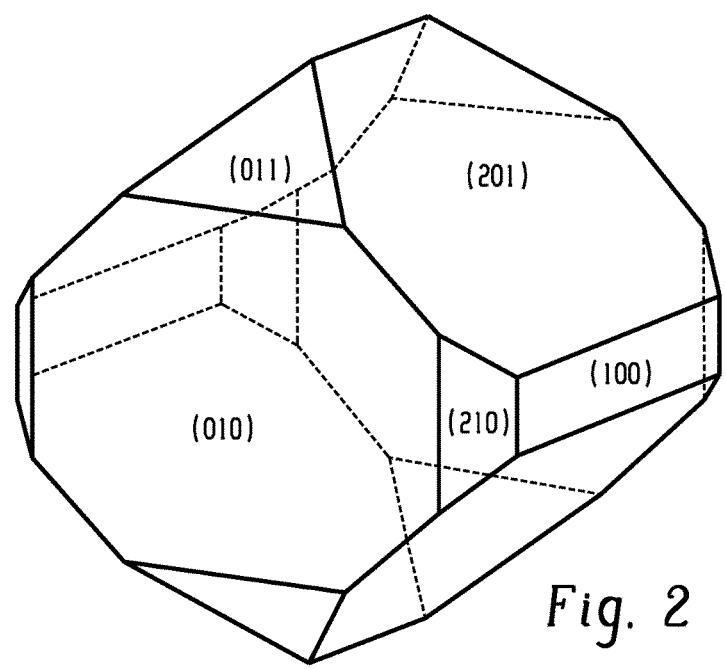
FIG. 2 shows the computed Wulff shape for lithium nickel phosphate, determined using density functional theory (DFT)

Miller index surface energies were calculated using the slab-vacuum model for stoichiometric surfaces. The generated Wulff shape for Ni-olivine exhibits (010) and (201) dominant surfaces and (100), (011), and (210) sub-surfaces, as shown in FIG. 2.

Figure 3:
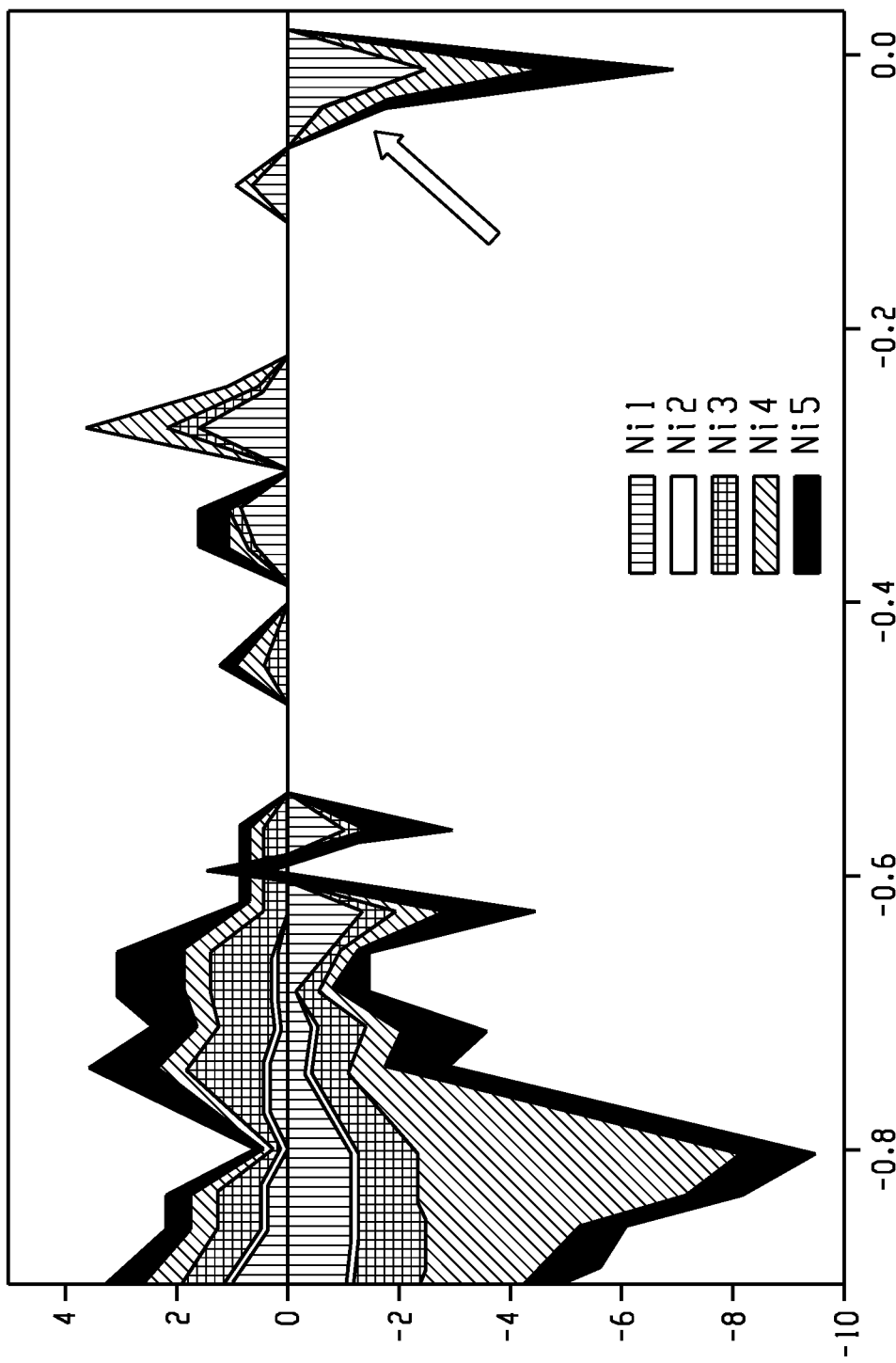
FIG. 3 shows Ni-projected density of states (DOS) for the lithium nickel phosphate (111) surface modeled using DFT.

None of the surfaces on the Wulff structure were determined to be electrochemically activated. In contrast, Ni ions at the (111) crystal plane were electrochemically activated, as shown in FIG. 3. Therefore, exposing the (111) surface in LNP nanoparticles will facilitate electrochemical activation of Ni ions.

Various aspects are shown in the accompanying drawings. This invention may, however, be embodied in many different forms, and should not be construed as limited to the aspects set forth herein. Rather, these aspects are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary aspects are described herein with reference to cross section illustrations that are schematic illustrations of idealized aspects. As such, variations from the shapes of the illustrations as a result, for example, of manufacturing techniques and/or tolerances, are to be expected. Thus, aspects described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation state" as used herein is a formalism used to describe a hypothetical charge that an atom would have if all bonds to atoms of different elements were 100% ionic, with no covalent component.

"Group" means a group of the Periodic Table of the Elements according to the International Union of Pure and Applied Chemistry ("IUPAC") Group 1-18 group classification system.

While a particular aspect has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A positive electrode active material comprising:
a plurality of lithium nickel phosphate nanoparticles having an olivine structure and having an exposed surface that is a {111} crystal plane;
wherein the {111} crystallographic plane is 20% to 95% of a total surface area of the nanoparticles.

2. The positive electrode active material of claim 1, wherein the nanoparticles comprise a (010) surface, and a ratio of the total area of the (010) crystal plane to the {111} crystal plane is 1:9 to 9:1.

3. The positive electrode active material of claim 1, wherein the nanoparticles comprise a (201) surface, and a ratio of the total area of the (201) crystal plane to the {111} crystal plane is 1:9 to 9:1.

4. The positive electrode active material of claim 1, wherein the plurality of lithium nickel phosphate nanoparticles has an average particle diameter of less than 100 nanometers.

5. The positive electrode active material of claim 1, wherein the {111} crystal plane is a (111) crystal plane.

6. The positive electrode active material of claim 1, wherein the lithium nickel phosphate nanoparticles comprise $LiNi(PO_4)$.

7. A positive electrode comprising the positive electrode active material of claim 1.

8. An electrochemical cell comprising
the positive electrode of claim 7;
a negative electrode; and
a separator between the positive electrode and the negative electrode.

9. An electrochemical cell comprising
the positive electrode of claim 7;
a negative electrode; and
a solid electrolyte between the positive electrode and the negative electrode.

\* \* \* \* \*